United States Patent [19]
Farmont et al.

[11] Patent Number: 5,603,372
[45] Date of Patent: Feb. 18, 1997

[54] SOLAR PROTECTION DEVICE, ESPECIALLY FOR TRANSPARENT SUN ROOFS OF AUTOMOBILES

[75] Inventors: Rolf Farmont, Düsseldorf; Michael Lenders, Meerbusch; Johannes Sutor, Düsseldorf, all of Germany

[73] Assignee: Westmont Technik GmbH & Co. KG, Germany

[21] Appl. No.: 512,193

[22] Filed: Aug. 7, 1995

[30] Foreign Application Priority Data

Aug. 9, 1994 [DE] Germany .............................. 9412811 U

[51] Int. Cl.⁶ .................................................... B60J 1/20
[52] U.S. Cl. .................... 160/370.21; 160/201; 296/220
[58] Field of Search ........................... 160/172 R, 370.21, 160/32, 34, 37, 201; 296/216, 220

[56] References Cited

U.S. PATENT DOCUMENTS

| | | | |
|---|---|---|---|
| 4,893,868 | 1/1990 | Miller et al. | 296/220 X |
| 5,335,961 | 8/1994 | Reinsch et al. | 296/220 X |
| 5,362,122 | 11/1994 | Reihl et al. | 296/220 X |
| 5,421,635 | 6/1995 | Reinsch et al. | 296/220 |
| 5,484,185 | 1/1996 | Salz et al. | 296/220 X |

FOREIGN PATENT DOCUMENTS

| | | |
|---|---|---|
| 4127624 | 9/1992 | Germany . |
| 4404618 | 3/1995 | Germany . |

*Primary Examiner*—David M. Purol
*Attorney, Agent, or Firm*—Vickers, Daniels & Young

[57] ABSTRACT

A solar protection device for sun roofs of motor vehicles is provided. The solar protection device includes at least a first lamella and a second lamella which are moved along two guides between an open position and a closed position, the two guides arranged between two guiding profiles which are generally parallel. The invention comprises at least a portion of each lamella arranged in a slanted position with respect to the guides and a mechanism for stacking the slanted portions of each lamella upon each other in the open position. The mechanism for stacking includes at least one link block for moving along the guides, the slanted portions being arranged to form ventilation gaps between adjacent front edges of a second lamella and rear edges of a first lamella in the closed position.

17 Claims, 4 Drawing Sheets

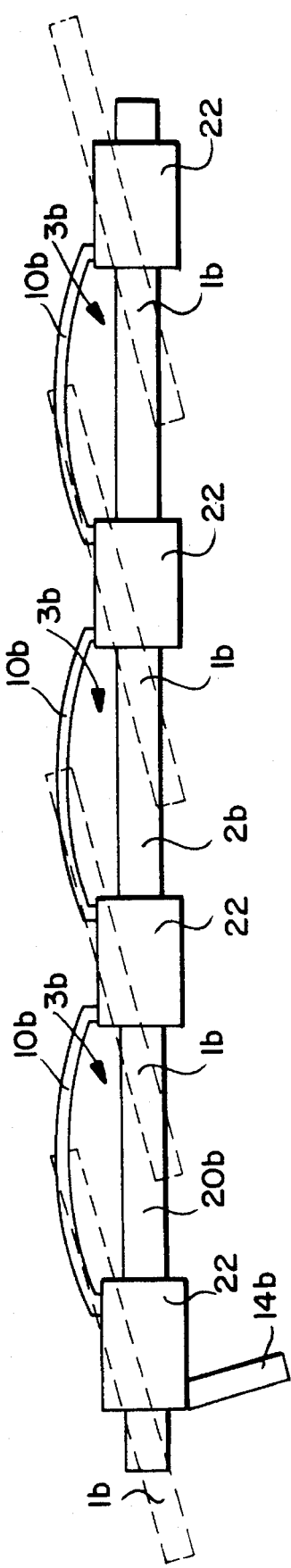
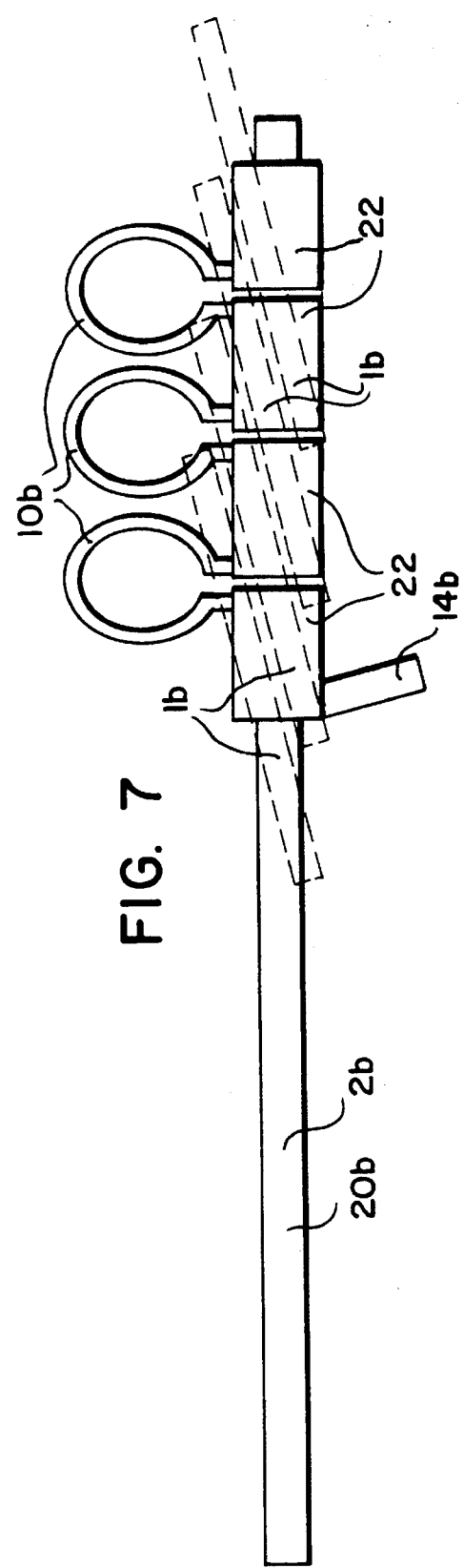

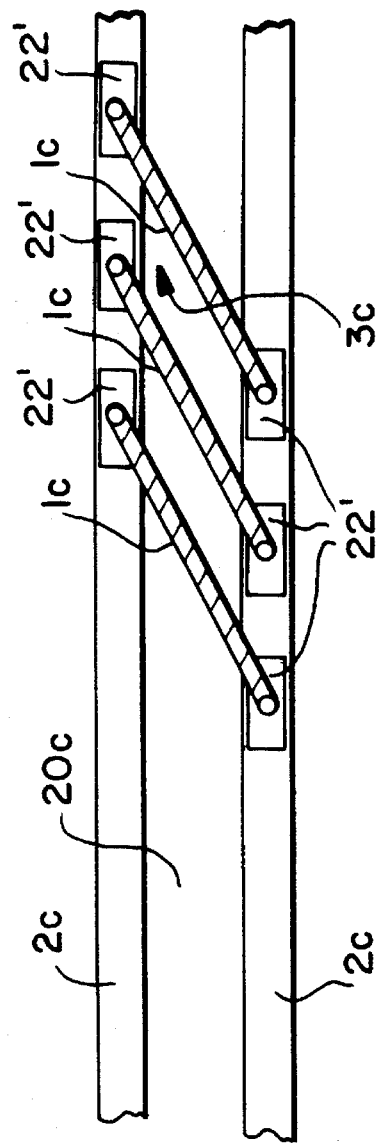
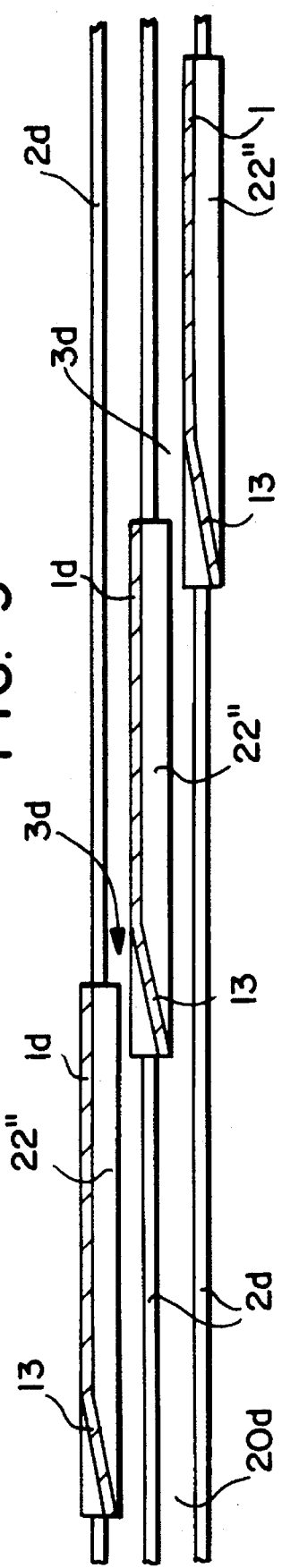

5,603,372

SOLAR PROTECTION DEVICE, ESPECIALLY FOR TRANSPARENT SUN ROOFS OF AUTOMOBILES

The invention concerns a solar protection device, especially for transparent sun roofs of automobiles, with at least two lamellae, which are moved in/on two guides arranged between two guiding profiles at essentially constant separation.

The invention particularly covers the area of application of solar protection devices for sun roofs in vehicles and, more precisely, any kind of vehicle roof windows such as sliding roofs with sliding cover plates under the roof panel of a vehicle roof, spoiler roofs with cover plates that can be tilted upward and to the rear out of the roof opening, tilting roofs, folding tops, and other types of openable skylights in vehicles.

BACKGROUND OF THE INVENTION

Solar protection devices are known generically, for instance, from German Utility Patent 93 15 575, in which a roof opening closable by a glass roof can be covered by means of lamellae. The lamellae are moved between two guides arranged between two guiding profiles at essentially constant separation. At the end to the rear of the vehicle, the guides have rectangular recesses extending downward at right angles to the long dimensions of the lamellae. These are storage spaces in which the lamellae can be stacked if the roof opening is left open. With the lamellae stacked, only a relatively small storage space is required for this solar protection device; thus this solar protection device is also suitable for after-market installations of sun roofs. The solar protection device need not be stored between the roof panel and the roof liner, but the lamellae pushes out of the storage space into the guides by spring pressure. The means required to apply this spring pressure are under some circumstances susceptible to damage, and are relatively expensive. For example, it can happen that the lamellae get stuck in the transition from the storage space to the guides. With this solar protection device, too, because the lamellae have to lie side by side in the closed position of the solar protection device, the solar protection device lets sufficient air through when the glass roof is raised only if the lamellae have slots for air flow.

SUMMARY OF THE INVENTION

The invention is based on the objective of providing a simply constructed yet reliably movable generic solar protection device which utilizes the slight space, height, and width available for installation, and which uses the maximum roof opening, assuring good ventilation in all working positions.

The solution presented is a generic solar protection device in which at least portions of the lamellae are in slanted positions with respect to the guides and the slanted portions can be stacked on top of each other by means of guide fingers or slots which are relatively short with respect to the width of the lamellae and/or at least two guides for each guide profile.

The slanted portions, or the slanted positioning of the lamellae, cause ventilation gaps to appear between the lamellae in the closed state of the solar protection device.

The slanted portions, or the slanted positioning, also make it possible for the lamellae to be stacked without a change in their height relative to each other or relative to the guides. This direct stackability allows the lamellae to be stacked in a relatively narrow stacking space when the roof opening is open without need for stacking means that cause incorrect operation, such as, for instance, springs or guides with changes in their cross sections.

By suitable choice of the widths and thicknesses of the lamellae, and of the angle of slant, the size of the ventilation gaps or the amount of light coming through the ventilation gaps, and the height or width of the stack of lamellae formed by the stacked lamellae can be determined.

Construction of a solar protection device according to the invention is further simplified by the straight design of the guides. The straight design of the guides has the further advantage that, because of the absence of curves in the guides, it is possible to develop functionally reliable storage of the lamella in the guides, especially with respect to tilting. To open the opening covered by the lamellae, the lamella are simply pushed to one side of the opening and are largely stacked on top of each other.

The parts to be used according to the invention, which have been mentioned above and which are described in the example embodiments, are not subject to any special or exceptional requirements with respect to their size, shape, material and technological concept, so that the selection criteria known in the particular field of application can be applied without limit.

BRIEF DESCRIPTION OF THE DRAWINGS

Further details, features and advantages of the subject of the invention appear from the following description of the attached drawings, in which preferred embodiments of the solar protection device according to the invention are shown as examples. The drawings show:

FIG. 6. A lateral view of guide slots in the guide of another embodiment of a solar protection device according to the invention with the roof opening covered.

FIG. 7. The guide slots of FIG. 6 with the roof opening open.

FIG. 8. Another embodiment of a solar protection device according to the invention in a vertical longitudinal section (similar to the line I—I of FIG. 3), and FIG. 9. Another embodiment of a solar protection device according to the invention in a vertical longitudinal section (similar to the line I—I of FIG. 3), in which each lamella is moved in exactly one guide.

PREFERRED EMBODIMENTS

Figure 1:
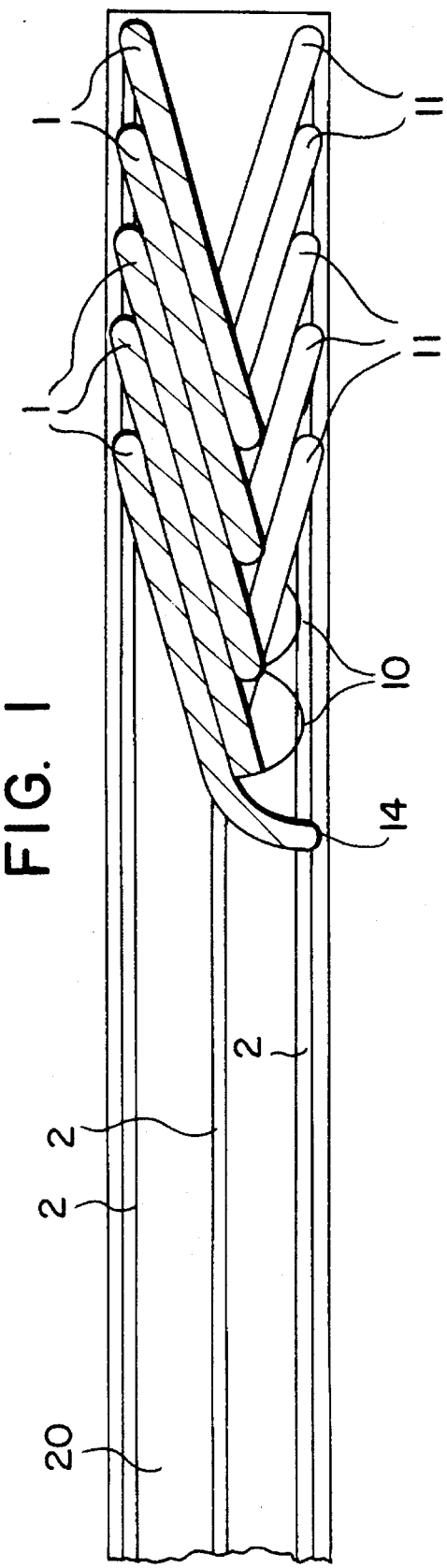
FIG. 1. A solar protection device with the roof opening opened along Section I—I of FIG. 3, in which all the lamella are guided by the same guides.
Figure 4:
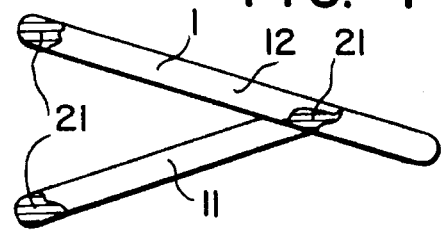
FIG. 4. One lamella of the solar protection device of FIGS. 1 to 3 in a lateral view.

FIG. 1 shows five stacked lamellae 1 of an initial embodiment of a solar protection device according to the invention which are moved in between guides 2 formed by three parallel guide profiles 20. Each of the lamellae 1 is connected to the adjacent lamella 1 through carriers 10 made as flexible bands. For stabilization, each lamella 1 has at its front end 12 an arm 11 which slants downward. As can be seen in FIG. 4, guide fingers 21 (link blocks) are provided on the front ends of the lamellae 12 or on the arm 11. Each of the guide fingers moves in a guide 2.

Figure 2:
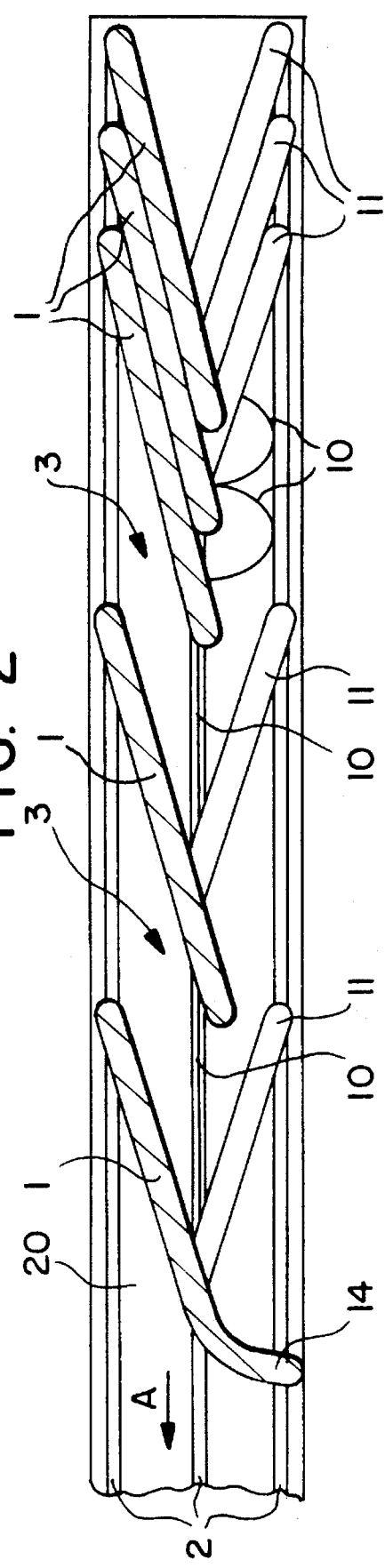
FIG. 2. The solar protection device of FIG. 1 with the roof opening partially covered.

In the stacked condition, the lamellae 1 lie immediately on top of each other with slight displacement. In order to cover an opening that can be covered by the lamellae, the lamella 1 nearest the front is moved in the direction of Arrow A (FIG. 2). To make the operation simpler, a grip 14 is provided on the front-most lamella. If the lamella 1 is moved in the direction of Arrow A by the length of the carrier 10 fastened to it, then the carrier 10 likewise moves the next lamella 1 in the direction of Arrow A, and so on. In this manner the opening is largely shielded from direct heat radiation; but, due to the slanted positions of the lamellae 1 with respect to the guides 2, air gaps 3 are formed, which assure ventilation as well as a certain passage of light through the solar protection device even when the opening is covered.

In order to open the roof opening, the front-most lamella 1 is moved opposite to the direction of Arrow A. The front-most lamella 1, after moving a certain distance to the right, strikes the next lamella 1, and so on, thus carrying with it all the lamellae 1 until they are stacked at the right end of the guides 2 (FIG. 1).

Figure 3:
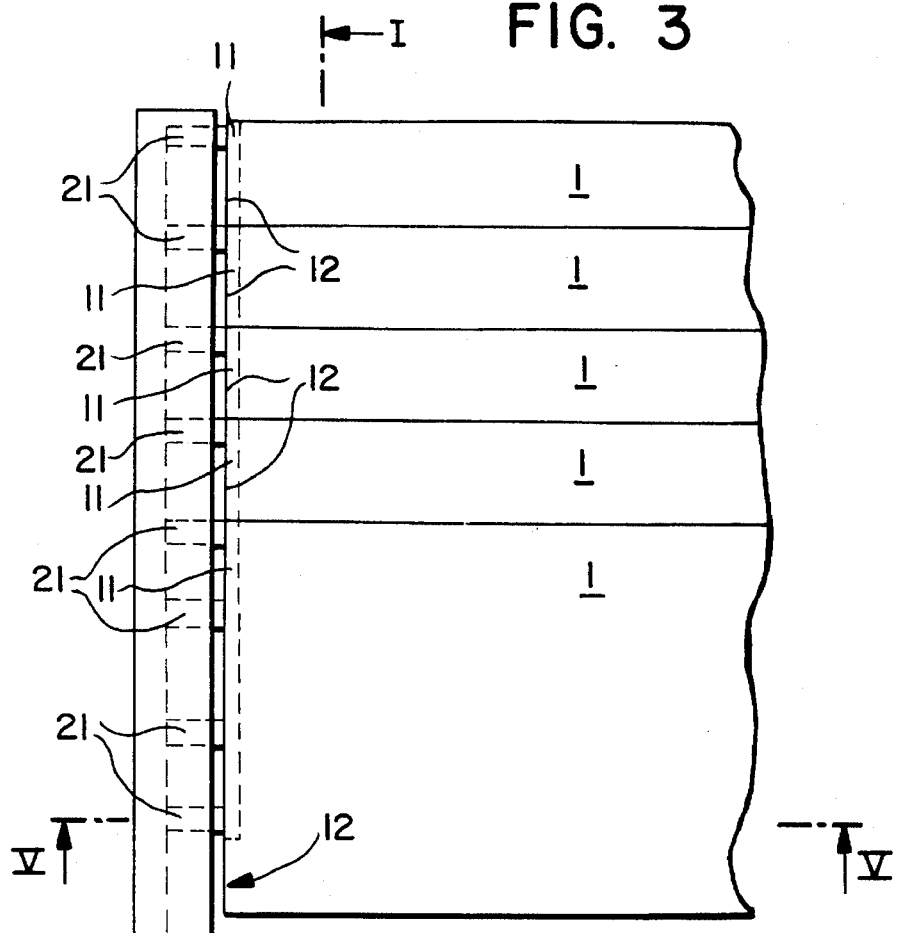
FIG. 3. The solar protection device of FIGS. 1 and 2 in plan view (in section).

For clarity, FIG. 3 shows the guides 2 and the guide fingers 21 and the arms 11 with dashed lines.

Figure 5:
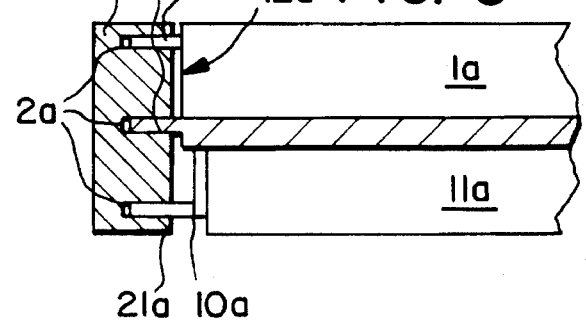
FIG. 5. An embodiment of a solar protection device similar to that in FIGS. 1 to 4, in a vertical section corresponding to the line V—V in FIG. 3.

In the embodiment shown in FIG. 5, the arm 11 is replaced by a lamella 11a which is parallel to the long dimension of lamella 1a, and which has an angle of tilt different from that of lamella 1a. The stability of the solar protection device can be further increased in this manner.

FIG. 6 shows a solar protection device in which the lamellae 1b (shown by dashed lines) are each moved by a guide block fastened at the front ends of the lamellae 1b. The guide blocks 22, which may if desired be at only one side of the opening, each grasp a guide profile made into a guide 2b. All of the adjacent guide blocks 22 are connected by flexible plastic strips forming the carriers 10b. The grip 14b is mounted on the front-most guide block 22 for simpler operation.

FIG. 6 shows the solar protection device in the state in which it covers the opening. Because the lamellae 1b are tilted with respect to the guides 2b there is an air gap 3b between each of the lamellae 1b. FIG. 7 shows the lamella in their stacked state.

FIG. 8 shows an embodiment of a solar protection device in which each guide profile 20c forms two guides 2c. There are two guide blocks 22' at the front ends of each lamella. Guide blocks 21 move each lamella in one of the guides 2c. For reasons of stability, among others, the guide blocks 22' are placed at about the height of a longitudinal edge of the lamella 1c. The slanted arrangement of the lamellae 1 with respect to the guides 2c can also be seen in this Figure.

It is apparent that in the embodiments shown in FIGS. 1 to 5 and 8, the distance between the guides 2 in a guide profile 20 can be designed to vary along the length of the guide profiles. In this way the angle of tilt of the lamellae 1 with respect to the guides 2 can be made variable and the width of the air gap 3 or of the stack height or width for the lamellae 1 can be adapted to external boundary conditions.

FIG. 9 shows a solar protection device in which each lamella 1d moves in exactly one guide of a guide profile 20d. The lamellae 1d have portions that are slanted with respect to the guides 2d, so that air gaps 3d are formed. The lamellae arranged in this manner can also be stacked at one side of the opening in a way that provides great saving of space.

| List of references to the drawings | |
|---|---|
| 1 | Lamella |
| 10 | Carrier |
| 11 | Arm |
| 11a | Lamella |
| 12 | Front end of lamella |
| 13 | Slanted portion |
| 14 | Grip |
| 2 | Guide |
| 20 | Guide profile |
| 21 | Guide finger |
| 22 | Guide blocks |
| 3 | Air gap |

Having thus described the invention it is claimed:

1. A solar protection device for sun roofs of motor vehicles, particularly for transparent sun roofs of motor vehicles, with at least a first lamella and a second lamella, which are moved along two guides and between an opened position and a closed position, said two guides arranged between two guiding profiles, which are generally parallel, the invention comprising at least a portion of each lamella arranged in a slanted position with respect to the guides, means for stacking the slanted portions of each lamella upon each other in said opened position, said means for stacking including at least one link block for moving along said guides, each said lamella having a front edge and a rear edge extending along the width between said guides, said link blocks extending a relatively short width relative to the front edge of said lamella, said slanted portions being arranged to form ventilation gaps between the adjacent front edge of said second lamella and the rear edge of said first lamella in said closed position.

2. A solar protection device according to claim 1, wherein said guides each extend between a first end and a second end, each said guide being linear between said ends.

3. A solar protection device according to claim 2, wherein each of said first and said second lamella are consecutively arranged along said guides by the consecutive arrangement of said link blocks.

4. A solar protection device according to claim 2, wherein each said lamella includes two link blocks attached at said front end of each lamella, each said link block mounted within a guide, whereby each lamella is supported by two guides.

5. A solar protection device according to claim 4, each said lamella having a first and a second longitudinal edge extending between said front edge and said rear edge, said longitudinal edges generally parallel to said guides and orthogonal to said front and said rear edges, one said link block attached adjacent said first longitudinal edge and the other said link block attached adjacent said second longitudinal edge.

6. A solar protection device according to claim 4, wherein each said lamella is fixedly attached at said front end to an arm portion which is oriented at an angle relative to said lamella, said arm portion extending between a forward end and a backward end, said forward end connected to said front end and to one of said link blocks, said backward end of said arm portion including at least one link block with respect to the lamella.

7. A solar protection device according to claim 2, wherein each said first lamella moves along said two generally parallel guides and said second lamella moves along a third and a fourth guide arranged between said two guiding profiles.

8. A solar protection device according to claim 7, wherein each said lamella has a first link block and a second link block for moving along each of said guides, each said lamella including a flat, rectangular front end portion and a flat rectangular rear portion, said front end portion at an angle relative to said rear portion.

9. A solar protection device according to claim 1, wherein each of said first and said second lamella are consecutively arranged along said guides by the consecutive arrangement of said link blocks.

10. A solar protection device according to claim 1, wherein each said lamella includes two link blocks attached at said front end of each lamella, each said link block mounted within a guide, whereby each lamella is supported by two guides.

11. A solar protection device according to claim 10, wherein each said lamella has a first and a second longitudinal edge extending between said front edge and said rear edge, said longitudinal edges generally parallel to said guides and orthogonal to said front and said rear edges, one said link block attached adjacent said first longitudinal edge and the other said link block attached adjacent said second longitudinal edge.

12. A solar protection device according to claim 10, wherein each said lamella is fixedly attached at said front end to an arm portion which is oriented at an angle relative to said lamella, said arm portion extending between a forward end and a backward end, said forward end connected to said front end and to one of said link blocks, said backward end of said arm portion including at least one link block with respect to the lamella.

13. A solar protection device according to claim 1, wherein each said first lamella moves along said two generally parallel guides and said second lamella moves along a third and a fourth guide arranged between said two guiding profiles.

14. A solar protection device according to claim 13, wherein each said lamella has a first link block and a second link block for moving along each of said guides, each said lamella including a flat, rectangular front end portion and a flat rectangular rear portion, said front end portion at an angle relative to said rear portion.

15. A solar protection device for sun roofs of motor vehicles, particularly for transparent sun roofs of motor vehicles, with at least a first lamella and a second lamella moved along at least two guides and arranged between two guiding profiles, which are generally parallel between an opened position and a closed position, the invention comprising at least a portion of each lamella arranged in a slanted position with respect to the guides, means for stacking the slanted portions of each lamella upon each other in said opened position, said means for stacking including at least one link block for moving along said guides, each said lamella having a front edge and a rear edge extending along the width between said guides, said slanted portions being arranged to form ventilation gaps between the adjacent front edge of said second lamella and the rear edge of said first lamella in said closed position.

16. A solar protection device according to claim 15, further including a third and a fourth guide and wherein said at least two guides include a first guide and a second guide, said first guide arranged with said third guide on one of said two guiding profiles and said second guide arranged with said fourth guide on the other of said two guiding profiles, said first lamella adapted to move along said first and said second guides, said second lamella adapted to move along said third and said fourth guides.

17. A solar protection device for sun roofs of motor vehicles, particularly for transparent sun roofs of motor vehicles, with at least a first lamella and a second lamella, which are moved along two guides and arranged on two guiding profiles, which are generally parallel between an opened position and a closed position, the invention comprising each lamella being a singular flat rectangular plate and arranged at a fixed angle relative to said guides, means for stacking each said lamella upon each other in said opened position, said means for stacking including at least one link block for moving along said guides, each said lamella having a front edge and a rear edge extending along the width between said guides, said link blocks extending a relatively short width relative to the front edge of said lamella, said lamella arranged to form ventilation gaps between the adjacent front edge of said second lamella and the rear edge of said first lamella in said closed position.

\* \* \* \* \*